United States Patent [19]

Oriani

[11] 3,707,865
[45] Jan. 2, 1973

[54] METHOD FOR RESTORING THE INITIAL WORK-HARDENED CONDITION IN A CONDUCTOR PORTION ANNEALED BY WELDING AND APPARATUS FOR CARRYING OUT SAID METHOD

[75] Inventor: Agostino Oriani, Sesto San Giovanni, Italy

[73] Assignee: Industrie Pirelli S.p.A., Milan, Italy

[22] Filed: Oct. 20, 1970

[21] Appl. No.: 82,439

[30] Foreign Application Priority Data

Feb. 3, 1970 Italy..............................20134 A/70

[52] U.S. Cl. ..........................72/340, 29/487, 72/377, 219/154, 140/112
[51] Int. Cl. ..............................................B21f 15/08
[58] Field of Search..............29/628, 480, 481, 487; 140/111, 112; 219/57, 154; 156/47, 49, 50; 174/74, 75, 84, 90; 72/340, 377

[56] References Cited

UNITED STATES PATENTS

| | | | |
|---|---|---|---|
| 1,906,600 | 5/1933 | Hofner | 156/49 |
| 3,486,219 | 12/1969 | Davies et al. | 29/480 |
| 3,166,665 | 1/1965 | Neukom et al. | 219/154 |
| 2,556,160 | 6/1951 | Ayers | 29/480 |
| 2,796,511 | 6/1957 | Steele | 219/57 |
| 2,756,308 | 7/1956 | Powell | 219/57 |

*Primary Examiner*—Lowell A. Larson
*Attorney*—Lorimer P. Brooks, Alfred L. Haffner, Harold Haidt and G. Thomas Delahunty

[57] ABSTRACT

The annealed region of electrical cable conductors which have been butt welded together are restored to their initial work-hardened condition by clamping them on opposite sides of the annealed region and applying forces in either or both the axial and transverse directions to the cables via the clamps so as to swage and work-harden the annealed region. The clamps include means for applying hammer-type forces, including inclined planes for obtaining axially directed forces; and they further include screw thread means for applying gradual swaging forces, as well as screw thread and pneumatic piston means for applying clamping forces.

11 Claims, 10 Drawing Figures

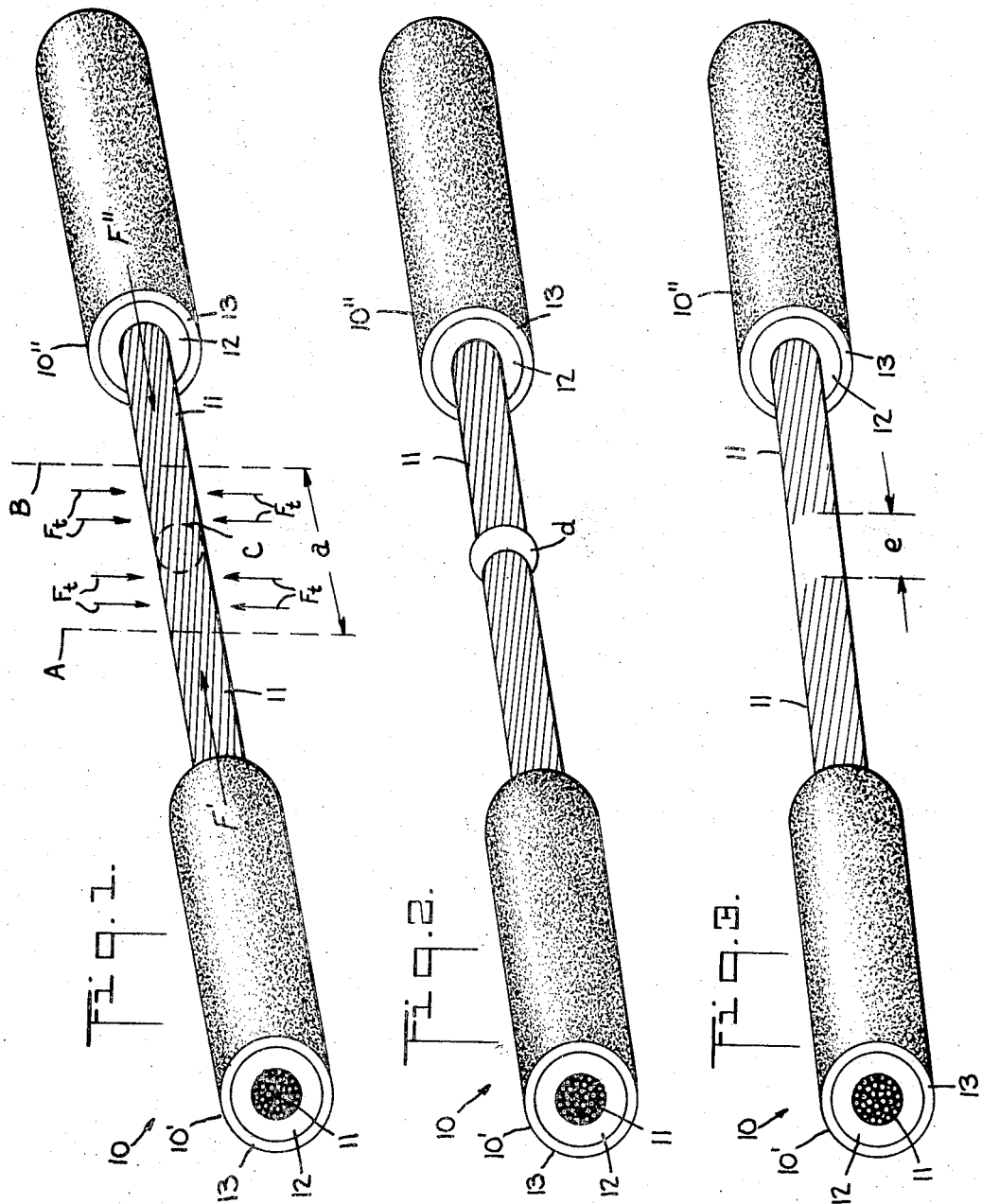

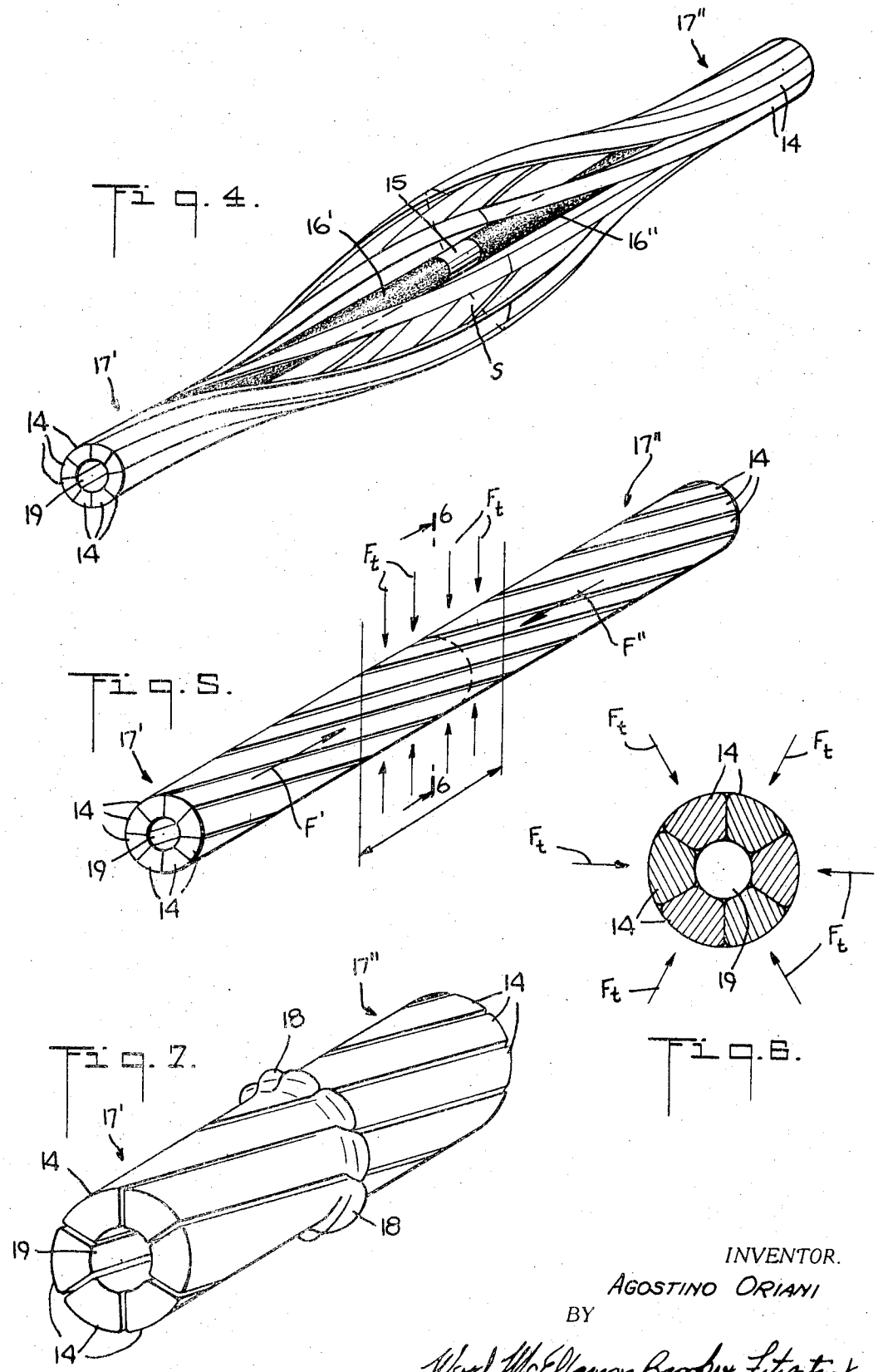

INVENTOR.
AGOSTINO ORIANI
BY
Ward, McElhannon, Brooks & Fitzpatrick
ATTORNEYS

METHOD FOR RESTORING THE INITIAL WORK-HARDENED CONDITION IN A CONDUCTOR PORTION ANNEALED BY WELDING AND APPARATUS FOR CARRYING OUT SAID METHOD

This invention relates to the treatment of electrical power transmission cables and more particularly, it concerns methods and apparatus for reestablishing the original structural condition of the electrical conductor of such cables, where the conductors have been modified in consequence of welding, in order to restore to the conductors their initial mechanical strength.

Long distance power cables, made of copper, aluminum or other metals, are generally manufactured with their conductors being formed by drawing, which work-hardens such metals. As is known, such work-hardened metals have mechanical characteristics, in particular, tensile strength, which are higher than those of annealed metals.

As is known to those skilled in the art, electrical conductors of the above-described type are sometimes formed by a layer of a plurality of segmental conductors; and in other cases, they are formed by a stranded configuration. These electric conductors are necessarily of a limited length, so that, in the construction of long-distance power cables, and in particular of submarine cables, the end of each skein or length of conductor segments made by at least a layer of a plurality of segmental conductors (hereinafter called segmentally stranded conductors) is joined by welding it to the end of a corresponding adjoining skein. This originates a region of reduced mechanical strength around the welded joint. In fact, in the welded region, the conductors become annealed, and the material thereof suffers a structural modification which results in a different degree of hardness. Now since the conductor size or diameter must remain uniform, such discontinuity does not allow the conductor to withstand, during the laying or recovering operations thereof, a substantial part of its own weight without becoming subjected to harmful consequences, as localized elongations, reduction in its cross-section, displacement of the insulating papers surrounding the conductor, and a decrease in its tensile strength. In the case of a segmental-type conductor, such discontinuity might result in a prejudicial concentration of large deformations in the welded area during the formation of the conductor in a standing machine.

It is known from metallurgy that, in order to obtain on a metal element a given degree of work-hardening, it is necessary to subject the annealed portion of the element to a drawing, stretching or swaging treatment. Various methods for the application of these techniques are already known. However, where electrical cable conductors are concerned, such methods are not applicable, either because only a short portion of bare cable is available or because (and this may apply even to a single segmental conductor) the conductor is so heavy and stiff that it cannot be subjected to the type of movements which might be employed for the work-hardening of its annealed portion.

The present invention provides a novel method which permits the carrying out of localized work-hardening in the annealed region near the welded joint of cable conductors. This novel method, moreover, does not involve any maneuvering of the cable itself or of the segmentally stranded conductor, which maneuvering may be handicapped by the weight or by the stiffness of the electrical conductor.

More particularly, the invention concerns a method for restoring the initial work-hardened condition in the portion of an electric conductor, which has become annealed in consequence of welding, and is characterized in that it involves subjecting the so-annealed portion of the conductor to a swaging action. This swaging action is carried out by compression and is produced by applying to the annealed portion of the conductor, at least two equal and opposite axial forces, the magnitude of such forces being related to the conductor cross-section, to its mechanical resistance and to the desired degree of work-hardening.

In one embodiment of the invention, the compression is exerted perpendicularly or transversely to the conductor axis over the entire area of its annealed region.

The present invention also concerns a novel apparatus for producing compression to obtain work-hardening of the annealed region of a cable conductor. This apparatus comprises two vises positioned on a bench or support in such a relationship that the cable conductor can be clamped at regions appropriately spaced apart a short distance beyond the opposite sides of the annealed region. At least one of the vises is moveable towards the other in response to a force directed along the cable axis so as to originate in the cable a compression in the annealed region.

There has thus been outlined rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A number of specific embodiments of the invention have been chosen for purposes of illustration and description and are shown in the accompanying drawing, forming a part of the specification, wherein:

FIG. 1 is a perspective view, partially cut away, showing two lengths of electrical power cable having copper-strand conductors which are butt-welded together;

FIG. 2 is a view similar to FIG. 1, but showing the conductors of the cable as they appear after a work-hardening operation according to the present invention;

FIG. 3 is a view similar to FIGS. 1 and 2, but showing the conductors of the cable as they appear after a finishing operation according to the present invention;

FIG. 4 is a perspective view of a pair of welded-together electrical cable cores made up of a plurality of segmentally stranded aluminum conductors as they appear in radially displaced array after a welding operation;

FIG. 5 is a perspective view of the cable core of FIG. 4 as it appears while undergoing axially and transversely directed work-hardening operations according to the present invention;

FIG. 6 is a cross-sectional view taken along line 5—5 of FIG. 5;

FIG. 7 is an enlarged perspective view of the cable core of FIG. 5 as it appears after the work-hardening operation represented therein;

Figure 10:
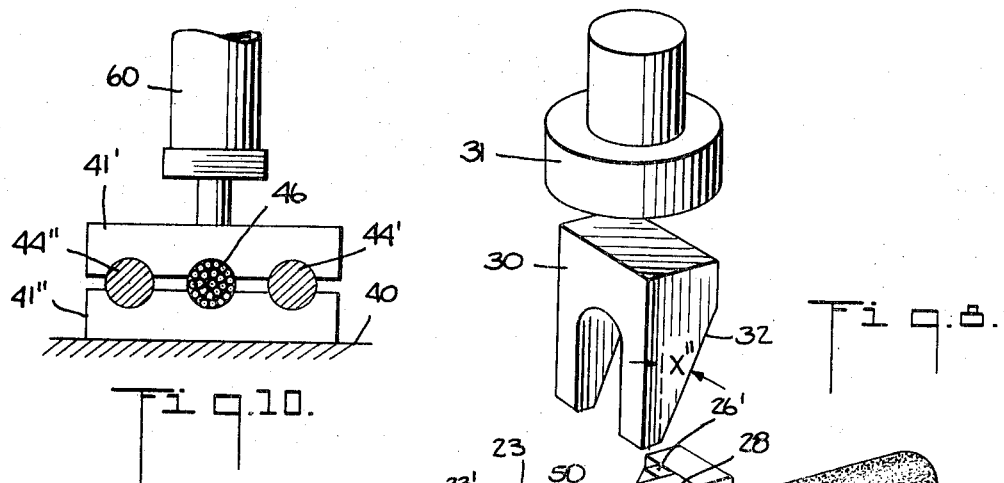
FIG. 10 is a section view showing an alternate arrangement for clamping cable conductors in the apparatus of FIG. 9.

As can be seen in FIGS. 1–3, a cable 10 is formed of two lengths 10' and 10". Each cable length includes a core of copper wires 11 which are butt welded together at a location indicated by a circumferential dotted line C in FIG. 1. Where the cable conductors are made up of strands, as illustrated, the welding is effected simultaneously over the whole section of the two contacting conductor lengths. As a result of this welding, a region of the conductors (i.e., the region between the dashed vertical lines A and B in FIG. 1) becomes annealed over a length represented by an arrow $a$. The cable conductors 11 are each covered by an insulation 12 which in turn is covered by a cable sheath 13. Turning now to FIG. 2, there is shown at $d$ in the vicinity of the welded joint, a bulged region which results from a swaging action. This same region on a finished cable conductor is indicated in FIG. 3 at $e$.

In FIGS. 4–7, there are shown a pair of lengths 17' and 17" of cable core, each comprising a plurality of segmental aluminum conductors 14. These segmental conductors are shown in FIG. 4 in radially spaced apart position as they appear immediately after having been butt welded where they meet with corresponding segmental conductors along a common plane $s$. The welding in cable conductors of this type is undertaken separately for each individual conductor segment. The conductor segments in each cable length are shaped to define a central oil duct 19. Two polytetrafluoroethylene (PTFE) tubes 16' and 16" together with a central sleeve 15 connect the ducts 19 of each cable length in the region of the spaced apart conductor segments. The central sleeve 15 is positioned such that its midline lies in the welding plane $s$. It will thus be seen that the two PTFE tubes 16' and 16", which are connected by the sleeve 15, serve to provide communication between the oil ducts 19 of the two cable lengths 17' and 17" which are welded to each other.

In accordance with the present invention, the strands of copper wires shown in FIGS. 1–3 are work-hardened by application of equal and opposite axially directed forces indicated by arrows F' and F", which subject the annealed region of the welded cable conductors to a buckling stress. These forces F' and F" are applied, respectively, to the conductor strands at the lines A and B, which define the region which has become annealed in consequence of the butt welding together of the stranded conductors. The forces F' and F" are proportional to the conductor section, its mechanical resistance and its desired work-hardening degree; and these forces are preferably applied by clamping with appropriate means to the two cable lengths in the vicinity of the annealed region and by pushing one length towards the other, either by displacing the two clamping means simultaneously toward each other or by moving only one of them toward the other.

In order to improve the work-hardening of the annealed region, additional transversely directed forces, having radial components, may be applied to such region. These transverse forces, which are indicated in FIG. 1 by arrows $F_t$, are obtained preferably by means of a succession of blows transmitted to the annealed region of the cable conductors through one or more force distribution means which surround them.

The treated portion of the cable conductors are thus subjected to a structural modification which makes them more compact and more mechanically resistant.

When the above-described work-hardening operation has been completed, there remains around the welded portion of the conductors a bulge caused by protruding stock $d$ of swaged material. This is subsequently removed, for example by filing down, in order to reduce the size of the region $e$ of the conductor to the same diameter as the remainder thereof (FIG. 3) and to leave unchanged, as much as possible, with respect to the original conductors, not only their mechanical, but also their electrical characteristics.

In order to achieve work-hardening of the segmentally stranded conductors 14 (FIG. 4) of oil-filled cables, it is preferred to insert the hollow tubular connecting element or sleeve 15 which is resistant to squeezing, and which together with the tubes 16' and 16" provides a continuity of the oil ducts 19 so that they extend with a continuous cross-section through the butt welded region of the segmental conductor ends of the two cable lengths. The sleeve 15 may be of steel. After the conductor segments have been welded together and then replaced radially to their original position over the hollow-connecting element, as shown in FIG. 5, the two axially directed forces F' and F" and the transversely directed forces $F_t$ are applied, as in the preceeding example. FIG. 6 illustrates the application of the forces $F_t$ about the cross-section of the annealed region.

The swaging action which results from the above, produces a bulge of swaged material 18, as shown in FIG. 7, which is formed in a compact configuration about the sleeve 15 and which is then eliminated as by filing, grinding, etc. to obtain a uniform conductor diameter.

The forces applied to the region to be annealed can be directed axially or axially and transversely; and they can be applied either simultaneously or alternatively in these different directions.

While the foregoing process has been described in connection with conductor strands and segmental conductors, it will be appreciated that method can be applied also to single segmental cable conductors.

Figure 8:
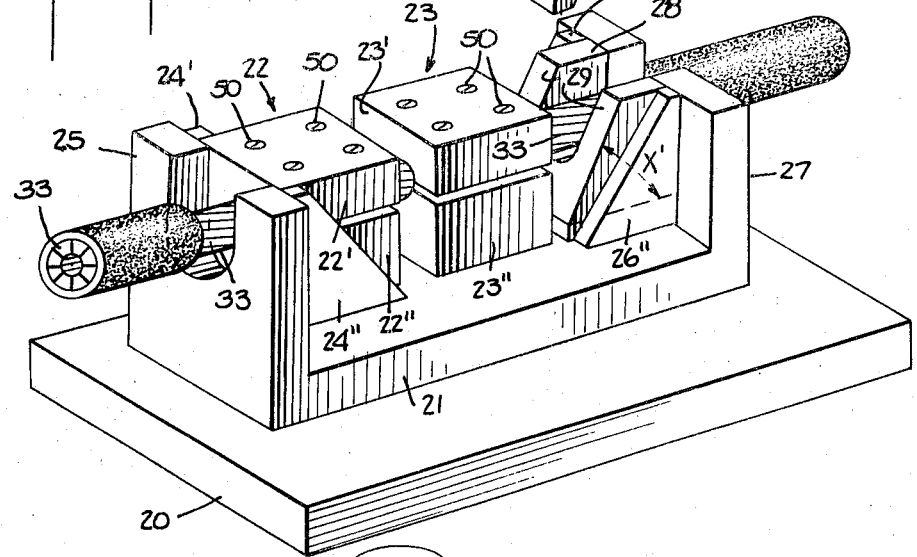
FIG. 8 is an exploded perspective view of apparatus in which the present invention is embodied and which operates to perform a work-hardening operation on welded-together segmentally stranded conductors.

FIG. 8 illustrates an apparatus which serves to obtain work-hardening of the annealed portion of welded-together cable conductors by axial compression. As shown in FIG. 8, a bench or support 20 is used to mount a bracket 21 for encasing a fixed gripping vise 22 and a displaceable gripping vise 23. These vises are each made up of a pair of jaws 22', 22" and 23', 23", respectively. Each pair of these jaws is maintained in coupled or gripping position by appropriate means, for example, screws 50.

The vise jaw 22' is held rigidly in place close to one end 25 of the bracket 21, by means of angle irons 24' and 24". A second pair of angle irons 26' and 26" are positioned at the other end 27 of the bracket 21. This second pair of angle irons serves to retain a block 28. This block 28 is formed with an inclined plane surface 29 which forms an angle $X'$ with the horizontal. A wedge 30 is provided which also has an inclined plane surface 32 which forms an angle $X''$ with the vertical. As can be seen, the angles $X'$ and $X''$ are complimentary to each other. As can be seen in FIG. 8, a ram 31 of a power hammer is positioned above the wedge 30. The ends 25 and 27 of the bracket 21, the block 28, the vises 22 and 23 and the wedge 30 are all provided with longitudinal recesses which accommodate the cable conductors to be work-hardened. As shown, a cable conductor 33 passes through these recesses. More particularly, the longitudinal recesses of each gripping vise include both jaws and are constituted to grip the cable conductor 33 to be work-hardened without any possibility of its slipping.

In FIG. 8, the cable conductor 33 is shown as prepared for a work-hardening operation in the gripping vises 22 and 23. These vises are clamped to the cable conductor at locations slightly beyond the opposite ends, respectively, of the portion thereof which becomes annealed due to welding.

The wedge 30 is placed, with its inclined plane surface 32, on the inclined plane surface 29 of the block 28. By operating the power hammer, its ram 31 moves downwardly and strikes the upper face of the wedge 30. This forces the wedge down between the inclined plane surface 29 and the vise 23; and thereby originates an axial component of the striking force. This causes the vise 23 to become displaced towards the vise 22, and to drag with it the clamped cable conductor 33. This movement creates in the cable conductor 33 a stock of swaged material which, as indicated above, may then be removed in a known manner to obtain a conductor of uniform cross-section.

Figure 9:
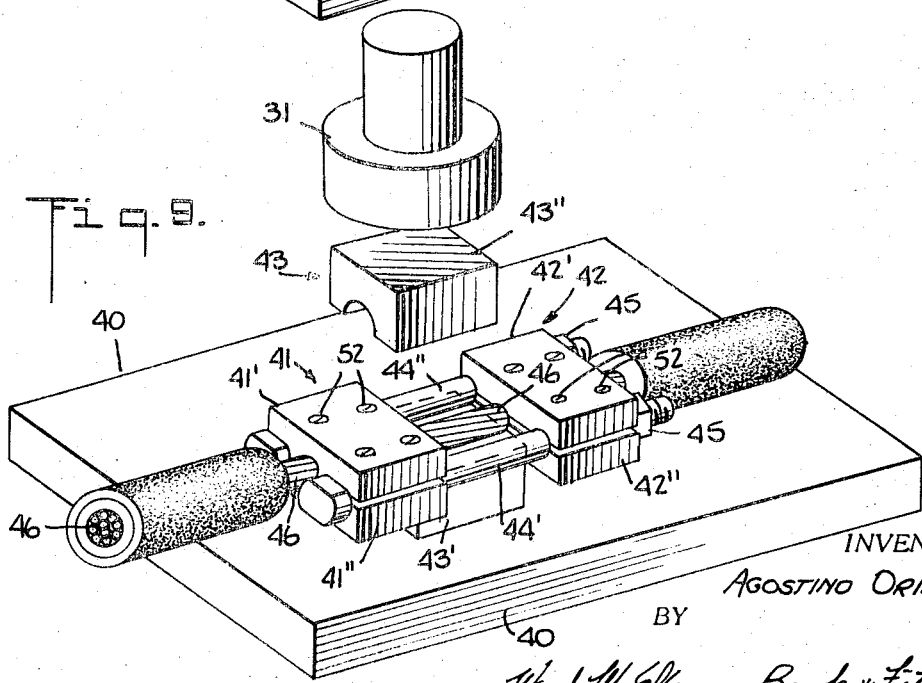
FIG. 9 is a view similar to FIG. 5, but showing alternate apparatus which operates to perform a work-hardening operation on welded-together strands of copper wires.

The apparatus of FIG. 9 operates to apply both axially and transversely directed forces alternatively to a welded cable conductor to achieve work-hardening of its annealed region.

In FIG. 9, there are shown two gripping vises 41 and 42, each constituted by a pair of jaws 41', 41" and 42', 42", respectively. The jaws of each pair are mounted on a bench or support 40 and are clamped to a cable conductor 46 with appropriate holding means, for example screws 52. The vises 41 and 42 are connected to each other by means of two parallel through pins 44' and 44". These pins extend parallel to and along opposite sides of the cable conductor 46. The through pins are each threaded on at least one end in order to receive a suitable nut 45. Each vise is initially positioned at an opposite end of each pin so that in rest condition the distance between the vises is slightly greater than the length of the annealed portion of the strand 46. A die 43, constituted by lower and upper half-shells 43' and 43", is disposed between the two vises 41 and 42. A power hammer ram 31, is arranged above the upper half-shell 43".

With the vises and the die in open position, as shown in FIG. 9, namely, after the removal therefrom of the respective upper vise jaws 41" and 42" and of the upper half-shell 43", the cable conductor 46 is positioned in corresponding recesses provided in the lower vise jaws 41' and 42' and in the lower half-shell 43'. The vises are then closed with their associated upper jaws; and they are locked by tightening the screws 52 or other fastening means. Thereafter, the nuts 45 are tightened at a pre-established rate. This operation causes the vises 41 and 42 each to move toward the other, thereby to apply an axially directed force to the annealed portion of the cable conductor between them. Then, without releasing this axial compression, the die 43 is re-assembled by replacing the upper half-shell 43" on the lower half-shell 43'. The die 43 is then able to distribute on the annealed portion of the cable conductor 46, transversely directed stresses which are originated by application of one or more blows of the power hammer ram 31.

The above-described application of axially and/or transversely directed stresses to the annealed portion of welded-together cable conductors can be repeated as many times as necessary to obtain a desired degree of work-hardening.

It will be appreciated that even if the use of the die 43 were excluded, the apparatus shown in FIG. 9 can be employed for work-hardening the welded area of a cable conductor by means of axial compression alone.

The nuts 45, which are tightened on the through pins 44' and 44", can be provided on one or both ends of these pins. If necessary, there may be provided more than two such through pins.

In the arrangement shown in FIGS. 8 and 9, the cable conductor to be work-hardened is illustrated as a strand; however, the same devices can be adapted to work-harden segmental type cable conductors by simply changing the shape of the recesses of the vises and of the die.

It will further be appreciated that in the devices shown in FIGS. 8 and 9, the vise jaws can be held closed by means other than screws; for example, by pneumatically operated pistons 60, as shown in FIG. 10.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended thereto.

What is claimed as new and desired to be secured by Letters Patent is:

1. A method for restoring the initial work-hardened properties at a welded portion of a work-hardened metal cable conductor which has lost at least some of said properties by the welding and annealing during the welding thereof, said portion being formed by a pair of annealed metal sections of the conductor joined by weld metal which is retained therebetween, said method comprising swaging said portion after the weld has been formed as aforesaid by subjecting said portion to at least axially directed compressive forces and compression sufficient to work harden, and substantially restore the work-hardened properties of, both the retained weld metal and the adjacent metal sections while retaining weld metal between the latter sections.

2. A method as set forth in claim 1, in which prior to application of said axial compressive forces said portion is formed with its peripheral dimensions throughout its length substantially equal to the peripheral dimensions of the adjacent conductor lengths.

3. A method according to claim 1, wherein said compressive forces are applied by means of a succession of blows.

4. A method as set forth in claim 1, wherein at least part of said portion enlarges due to the application of said axial compressive forces and is reduced substantially to the peripheral size of the adjacent conductor lengths by applying compressive forces to the enlarged part which are directed transversely to said axial forces.

5. A method according to claim 4, wherein the axially and transversely directed forces are applied simultaneously.

6. A method according to claim 4, wherein said compressive forces are applied by means of a succession of blows.

7. A method as set forth in claim 1, wherein said cable conductor surrounds an oil duct and a sleeve resistant to squeezing is positioned in said oil duct within the welded portion of the cable conductor prior to swaging thereof and wherein said swaging action is carried out around said sleeve.

8. A method as set forth in claim 1, wherein said axially directed compressive forces are applied to said welded portion by gripping said conductor at locations just beyond the ends of said portion and applying said forces at said locations thereby producing a swaging action and a bulged region at the weld and further comprising reducing the peripheral dimensions of the bulged region to the peripheral dimensions of the adjacent conductor lengths thereby to form a finished cable conductor whose dimensional, mechanical and electrical characteristics in the region of the weld are substantially the same as those of the remainder of the conductor.

9. A method as set forth in claim 8, wherein the bulged region is reduced in dimensions by cutting away the bulged metal thereof.

10. A method as set forth in claim 8, wherein the bulged region is reduced in dimensions by swaging thereof with forces directed transversely to the axis of the conductor.

11. A method as set forth in claim 1, wherein said weld metal is formed by structurally modified metal of the conductor.

* * * * *